US008560566B2

(12) United States Patent
Roshen

(10) Patent No.: US 8,560,566 B2
(45) Date of Patent: *Oct. 15, 2013

(54) SEARCH CAPABILITY ENHANCEMENT IN SERVICE ORIENTED ARCHITECTURE (SOA) SERVICE REGISTRY SYSTEM

(75) Inventor: Waseem A. Roshen, Hilliard, OH (US)

(73) Assignee: International Business Machines Corporation, Armonk, NY (US)

( * ) Notice: Subject to any disclaimer, the term of this patent is extended or adjusted under 35 U.S.C. 154(b) by 181 days.

This patent is subject to a terminal disclaimer.

(21) Appl. No.: 12/945,151

(22) Filed: Nov. 12, 2010

(65) Prior Publication Data
US 2012/0124546 A1 May 17, 2012

(51) Int. Cl.
G06F 7/00 (2006.01)
G06F 17/30 (2006.01)

(52) U.S. Cl.
USPC .......................................................... 707/769

(58) Field of Classification Search
USPC .......................................................... 707/769
See application file for complete search history.

(56) References Cited

U.S. PATENT DOCUMENTS

| 5,274,806 | A | 12/1993 | Hill |
| 6,023,701 | A | 2/2000 | Malik et al. |
| 6,438,556 | B1 | 8/2002 | Malik et al. |
| 6,519,585 | B1 | 2/2003 | Kohli |
| 6,961,937 | B2 | 11/2005 | Avvari et al. |
| 7,124,062 | B2 | 10/2006 | Gebhart |
| 7,321,919 | B2 | 1/2008 | Jacobs et al. |
| 7,634,462 | B2 | 12/2009 | Weyand et al. |
| 7,676,460 | B2 | 3/2010 | Morgan |

(Continued)

FOREIGN PATENT DOCUMENTS

| EP | 1855218 A2 | 11/2007 |
| WO | 2006110684 A2 | 10/2006 |
| WO | 2006113092 A2 | 10/2006 |
| WO | 2008078366 A1 | 12/2006 |

OTHER PUBLICATIONS

Dr. Waseem Roshen: "Service Registry with Advanced Search Capability: Part 1: Concepts, Process, and Components", Website, Internet Article, Nov. 6, 2009, pp. 1-9, Retrieved from the Internet: URL: http://public.dhe.ibm.com/software/dw/webservices/ws-SOAregadvsearch/ws-SOAregadvsearch-pdf.pdf.*

(Continued)

Primary Examiner — Jacob F Bétit
Assistant Examiner — Christy Lin
(74) Attorney, Agent, or Firm — Schmeiser, Olsen & Watts LLP

(57) ABSTRACT

A system and associated method for searching a web service registry system by use of a search controller. The web service registry system has components of the search controller, a service registry, a name parser, a dictionary, and a name composer. The search controller receives a service name from a user of the web service registry system. The service registry is searched with the service name to find a service description associated with the service name. If the service description is not found, the search controller coordinates another search with a candidate service name that substitutes the service name for searching the service registry. The candidate service name is generated by use of the name parser, the dictionary, and the name composer. The search controller discovers the service description associated with the candidate service name and returns to a user of the service registry system.

16 Claims, 7 Drawing Sheets

(56) References Cited

U.S. PATENT DOCUMENTS

| | | | |
|---|---|---|---|
| 7,676,462 | B2 | 3/2010 | Kirkland et al. |
| 7,676,472 | B2 | 3/2010 | Kurhekar et al. |
| 7,693,829 | B1 | 4/2010 | Alshawi |
| 7,966,320 | B2 | 6/2011 | Roshen |
| 7,996,394 | B2 | 8/2011 | Roshen |
| 8,156,140 | B2 | 4/2012 | Roshen |
| 2002/0052948 | A1 | 5/2002 | Baudu et al. |
| 2002/0174262 | A1 | 11/2002 | Marcos et al. |
| 2004/0064554 | A1 | 4/2004 | Kuno et al. |
| 2004/0186831 | A1 | 9/2004 | Hiratsuka et al. |
| 2004/0236780 | A1 | 11/2004 | Blevins et al. |
| 2005/0065920 | A1 | 3/2005 | He et al. |
| 2005/0114306 | A1 | 5/2005 | Shu et al. |
| 2005/0278410 | A1 | 12/2005 | Espino |
| 2006/0248176 | A1 | 11/2006 | McDowall |
| 2006/0265508 | A1 | 11/2006 | Angel et al. |
| 2007/0033167 | A1 | 2/2007 | Basu et al. |
| 2007/0162421 | A1 | 7/2007 | Pang et al. |
| 2007/0263534 | A1 | 11/2007 | Pavlick |
| 2008/0059486 | A1 | 3/2008 | Pappas |
| 2008/0069124 | A1 | 3/2008 | Patrick |
| 2008/0086370 | A1 | 4/2008 | Narayanaswami et al. |
| 2008/0091670 | A1 | 4/2008 | Ismalon |
| 2008/0120380 | A1 | 5/2008 | Boyd et al. |
| 2008/0133508 | A1 | 6/2008 | Jiang et al. |
| 2008/0208835 | A1 | 8/2008 | Sauls et al. |
| 2008/0250097 | A1 | 10/2008 | Angelini et al. |
| 2008/0306751 | A1 | 12/2008 | Conroy et al. |
| 2009/0018998 | A1 | 1/2009 | Patten, Jr. et al. |
| 2009/0049040 | A1 | 2/2009 | Fay et al. |
| 2009/0063522 | A1 | 3/2009 | Fay et al. |
| 2009/0070456 | A1 | 3/2009 | Brown et al. |
| 2009/0089078 | A1 | 4/2009 | Bursey |
| 2009/0089277 | A1 | 4/2009 | Cheslow |
| 2009/0125332 | A1 | 5/2009 | Martin |
| 2009/0132698 | A1 | 5/2009 | Barnhill, Jr. |
| 2009/0144262 | A1 | 6/2009 | White et al. |
| 2009/0144266 | A1 | 6/2009 | Bicioglu |
| 2009/0193096 | A1 | 7/2009 | Boyer et al. |
| 2009/0210408 | A1 | 8/2009 | Boyer et al. |
| 2009/0222429 | A1 | 9/2009 | Aizenbud-Reshef et al. |
| 2009/0235167 | A1 | 9/2009 | Boyer et al. |
| 2010/0017387 | A1 | 1/2010 | Roshen |
| 2010/0017405 | A1 | 1/2010 | Roshen |
| 2010/0036838 | A1 | 2/2010 | Ellis |
| 2010/0042590 | A1 | 2/2010 | Smyros et al. |
| 2011/0125776 | A1 | 5/2011 | Roshen |
| 2012/0124076 | A1 | 5/2012 | Roshen |
| 2012/0226686 | A1 | 9/2012 | Roshen |

OTHER PUBLICATIONS

Warner Onstien et al.: "Build SOA with Web services using WebSphere Studio, Part 1: Introduction to SOA and Web services", Website, Internet Article, Nov. 11, 2004, Whole document, Retrieved fromteh Internet: URL: http://www.ibm.com/developerworks/webservices/tutorials/ws-soa-1/.*

Onstine et al.; Build SOA with Web services using WebSphere Studio, Part 1: Introduction to SOA nad Web services, Website, Internet Article, Nov. 11, 2004, Whole document, Retrieved from the Internet: URL: http://www.ibm.com/developerworks/webservices/tutorials/ws-soa-1/ (filed in conjunction with Office Action (Mail Date Jan. 3, 2012) for U.S. Appl. No. 12/945,337, filed Nov. 12, 2010; Confirmation No. 7540).

Lausen et al.; Survey of Current Means to Discover Web Services; Semantic Technology Institute (STI) Aug. 2008; 15 pages.

Ahmadi et al.; Flexible Matching and Ranking of Web Service Advertisements; Nov. 2007; 22 pages.

Mokhtar et al.; Interoperable Semantic & Tyntactic Service Matching for Ambient Computing Environments; Aug. 2008; 11 pages.

Bai et al.; Resource Matching and a Matchmaking Service for an Intelligent Grid; International Conference on Computational Intelligence 2004; 4 pages.

Corrales et al.; BeMatch: A Platform for Matchmaking Service Behavior Models; Mar. 2008; 5 pages.

Medjahed et al.; Composing Web Services on the Semantic Web; The VLDB Journal (2003); pp. 333-351.

Nawaz et al.; SEMREG-PRO: A Semantic based Registry for Proactive Web Service Discovery using Publish-Subscribe Model; Fourth International Conference on Semantics, Knowledge and Grid, IEEE 2008; pp. 301-308.

Roshen, Waseem, Ph. D., "Service Registry with Advanced Search Capability, Part 1: Concepts, Process, and Components", Internet Article Dated Nov. 6, 2009, pp. 1-9. [retrieved from http://public.dhe.ibm.com/software/dw/webservices/ws-SOAregadvsearch/ws-SOAregadvsearch-pdf.pdf on Jan. 11, 2011].

Balani, Naveen, "Model and Build ESB SOA Frameworks", Internet Article Dated Mar. 15, 2005, pp. 1-4. [retrieved from http://www.ibm.com/developerworks/web/library/wa-soaesb/ on Jan. 12, 2011].

International Search Report for PCT/EP2010/066559, Dated Jan. 27, 2011. 5 pages.

Papazoglou et al., "Service Oriented Architectures: Approaches, Technologies and Research Issues," VLDB Journal, Springer Berlin / Heidelberg, vol. 6, No. 3, Jul. 2007, pp. 389-415(27).

Soto-Carrion et al., "General Ontology Service Engine (GORSE): a new approach to integrate the semantic web knowledge on service oriented architectures," pp. 1-22 retrieved Nov. 2009. http://www.imai-software.com/openlab/data/GROSE_DRAFTv0_1.pdf.

"osESB Documentation, Part 1: The SOA Stack and the ESB," Nov. 5, 2007, pp. 1-22. http://www.osesb.org/documentation/The%20SOA%20Stack%20and%20the%20ESB.pdf.

Pohlsen et al., "A Concept for a Medical Device Plug-and-Play Architecture based on Web Services," pp. 1-7, retrieved Oct. 20, 2009. http://sigbed.seas.upenn.edu/archives/2009-07/SchlichtingSIGBED.pdf.

* cited by examiner

```
L101:   <definitions name="globalWeatherService"
L102:      targetNamespace=http://globService.com/ns/globalWeather/wsdl
L103:      xmlns:tns=http://globalService.com/globalWeather/wsdl
L104:      xmlns:SOAP-EXT=http://schemas.xmlsoap.org/wsdl/soap/
L105:      xmlns=http://schemas.xmlsoap.org/wsdl/>

L106:   <types>
L107:      <schema targetNamespace=
                    http://globalService.com/ns/globalWeather/wsdl
L108:         xmlns=http://www.w3.org/2001/XMLSchema>
L109:         <complexType name="inputType">
L110:            <sequence>
L111:               <element name="City" type="xsd:string"/>
L112:               <element name="State" type="xsd:string"/>
L113:               <element name="Country" type="xsd:string"/>
L114:            </sequence>
L115:         </complexType>
L116:         <complexType name="outputType">
L117:            <sequence>
L118:               <element name="temperature" type="xsd:int">
L119:               <element name="condition" type="xsd:string">
L120:               <element name="windSpeed" type="xsd:decimal">
L121:               <element name="windDirection" type="xsd:string">
L122:            </sequence>
L123:         </complexType>
L124:      </schema>
L125:   </types>

L126:   <message name="inputParameters">
L127:      <part name ="input" type="inputType"/>
L128:   </message>

L129:   <message name="outputParameters">
L130:      <part name="output" type="outputType"/>
L131:   </message>

L132:   <portType name="weatherServicePortType">
L133:      <operation name="getWeather">
L134:         <input message="tns:inputParameters"/>
L135:         <output message="tns:outputParameters"/>
L136:      </operation>
L137:   </portType>
```

FIG. 4

SEARCH CAPABILITY ENHANCEMENT IN SERVICE ORIENTED ARCHITECTURE (SOA) SERVICE REGISTRY SYSTEM

CROSS-REFERENCE TO RELATED APPLICATIONS

This invention is related to U.S. patent application Ser. No. 12/174,944 entitled "SYSTEM AND METHOD FOR PERFORMING ADVANCED SEARCH IN SERVICE REGISTRY SYSTEM", filed on Jul. 17, 2008, now U.S. Pat. No. 7,996,394, issued Aug. 9, 2011, and U.S. patent application Ser. No. 12/175,552 entitled "SYSTEM AND METHOD FOR IMPROVING NON-EXACT MATCHING SEARCH IN SERVICE REGISTRY SYSTEM WITH CUSTOM DICTIONARY", filed on Jul. 18, 2008, now U.S. Pat. No. 7,966,320, issued Jun. 21, 2011.

BACKGROUND OF THE INVENTION

Aspects of present invention disclose a system and associated method for automatically performing advanced searches for a service description by use of a search controller in a service-oriented architecture (SOA) service registry system. Conventional SOA service registry systems require users to provide an exact service name to search for a specific service description published in a registry of the SOA registry system. Also, because conventional SOA service registry systems have tightly coupled processing components, it is difficult to improve functionality and/or performance of conventional SOA service registry systems in a scalable fashion.

BRIEF SUMMARY

According to one embodiment of the present invention, a method for searching a web service registry system by use of a search controller, the method comprises: the search controller receiving a service name from a user of the web service registry system, wherein the web service registry system comprises the search controller, a service registry, a name parser, a dictionary, and a name composer, and wherein the service registry comprises at least one service description searchable by a respectively associated service name; performing a first search of the service registry with the received service name and subsequently determining that the received service name does not have a service description associated with the received service name in the service registry; coordinating a second search of the service registry with a candidate service name by use of the name parser, the dictionary, and the name composer, wherein the candidate service name is semantically and syntactically interchangeable with the received service name such that the candidate service name identifies the service description associated with the received service name within the service registry; and discovering the service description is associated with the candidate service name within the service registry and subsequently returning the discovered service description to the user of the web service registry system.

According to one embodiment of the present invention, a computer program product comprises a computer readable memory unit that embodies a computer readable program code. The computer readable program code contains instructions that, when run by a processor of a computer system, implement a method for searching a web service registry system by use of a search controller.

According to one embodiment of the present invention, a computer system comprises a processor and a computer readable memory unit coupled to the processor, wherein the computer readable memory unit containing instructions that, when run by the processor, implement a method for searching a web service registry system by use of a search controller.

According to one embodiment of the present invention, a process for supporting computer infrastructure, said process comprising providing at least one support service for at least one of creating, integrating, hosting, maintaining, and deploying computer-readable code in a computing system, wherein the code in combination with the computing system is capable of performing a method for searching a web service registry system by use of a search controller.

BRIEF DESCRIPTION OF THE SEVERAL VIEWS OF THE DRAWINGS

FIG. 4 is an example listing of a service oriented architecture (SOA) service description written in the Web Services Description Language (WSDL), in accordance with the embodiments of the present invention.

DETAILED DESCRIPTION

Figure 1:
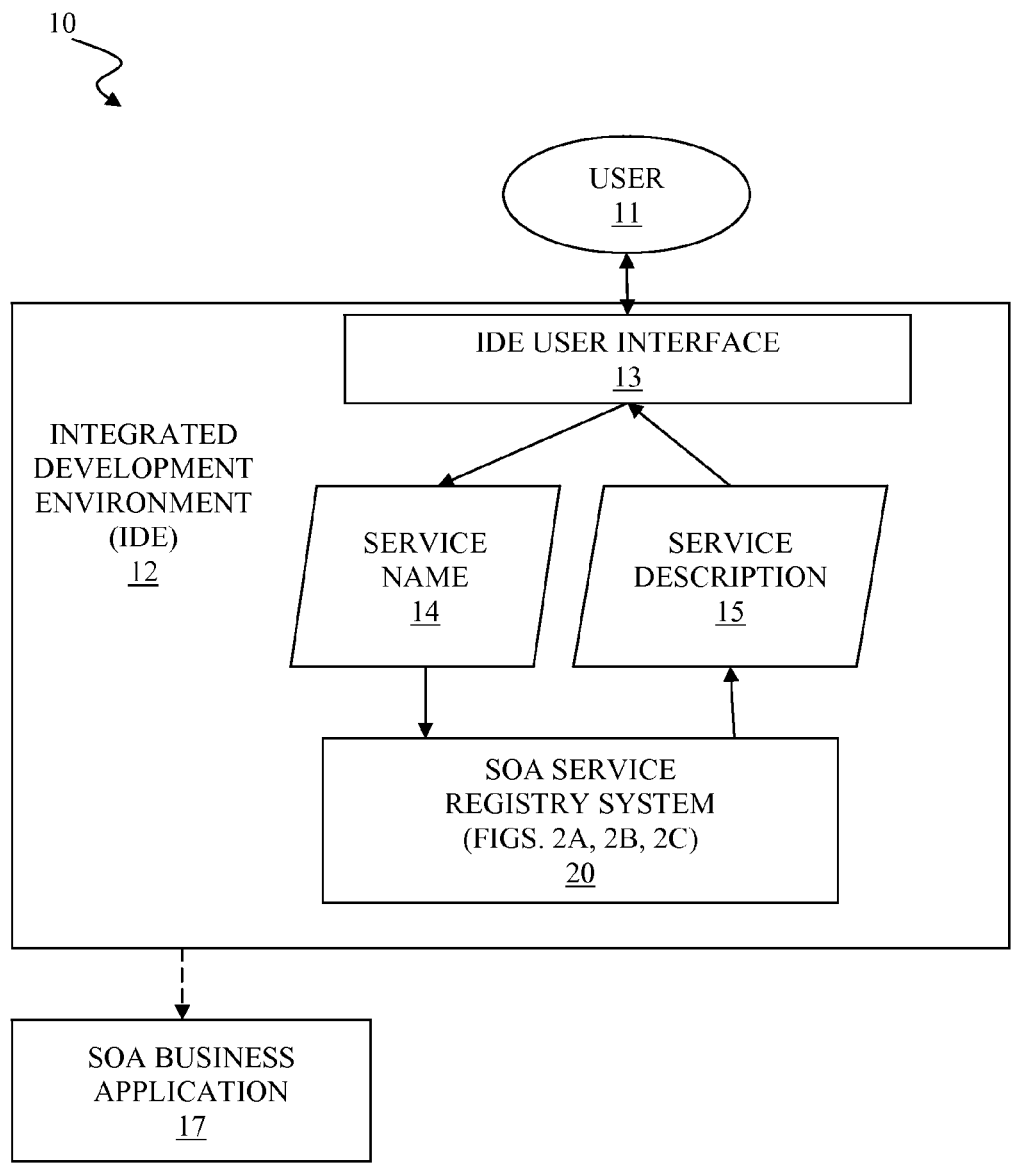
FIG. 1 illustrates a system for searching a web service registry system in an integrated development environment (IDE), in accordance with embodiments of the present invention.

FIG. 1 illustrates a system 10 for searching a web service registry system in an integrated development environment (IDE) 12, in accordance with embodiments of the present invention.

The system 10 comprises a user 11 and the IDE 12 in which the user 11 is developing a service-oriented architecture (SOA) business application 17 and/or a software project comprising the SOA business application 17. In this specification, terms "SOA service," "web service," and "service" are used interchangeably.

The SOA business application 17 utilizes at least one SOA service registry entry {service name, service description}, in which each service name uniquely identifies a respective service description. Each service description comprises information necessary to provide a SOA service identified by a respective service name within each SOA service registry entry.

The IDE 12 comprises an IDE user interface 13 and a service-oriented architecture (SOA) service registry system 20. Examples of the IDE user interface 13 may be, inter alia, application programming interface (API), a user interface to receive a web service name to search an associated web service description, and combinations thereof. The SOA service registry system 20 comprises said at least one SOA service registry entry {service name, service description} and components facilitating a search of a service description 15 by user of a service name 14 that is associated with the service description 15 in a particular service registry entry. The SOA service registry system 20 is configured to look up the service description 15 with a service name 14 provided by the user 11. See FIGS. 2A, 2B, and 2C, infra, for embodiments of the SOA service registry system 20.

The user 11 provides the service name 14 as an input to the SOA service registry system 20 through the IDE user interface 13 to search the service description 15 corresponding to the service name 14. The user 11 receives the service description 15 comprising a service name value that matches the service name 14 if the service description 15 is found in the SOA service registry system 20. The user 11 receives a null wherein no service description comprising a service name value that matches the service name 14 is found in the web service registry system 20. See descriptions of FIG. 3, infra, for detailed search operations.

The service description 15 comprises development time information, a communication protocol and a message format. An example of the development time information may be, inter alia, operations exposed by a given service, etc. Examples of the communication protocol may be, inter alia, the Hypertext Transfer Protocol (HTTP), Internet Inter-Orb Protocol (IIOP), Java Remote Method Protocol (JRMP), Java Message Service (JMS) protocol, etc. An example of the message format may be, inter alia, the Simple Object Access Protocol (SOAP), etc. The service description 15 further comprises runtime information such as the IP address and port number for a given service implementation. Web Service Description Language (WSDL) is usually employed to describe a SOA service. See FIG. 4, infra, for an example of the service description for a SOA service registry entry written in Web Services Description Language (WSDL) format.

The SOA service registry system 20 comprises a service registry, a name parser, a dictionary, a name composer, a search controller, and a SOA service registry system interface. The service registry is used to publish service descriptions and to search published service descriptions with a respective service name. See descriptions of FIGS. 2A, 2B, and 2C, infra, for each component and interactions among the components in various configuration of the SOA service registry system 20.

Figure 2A:
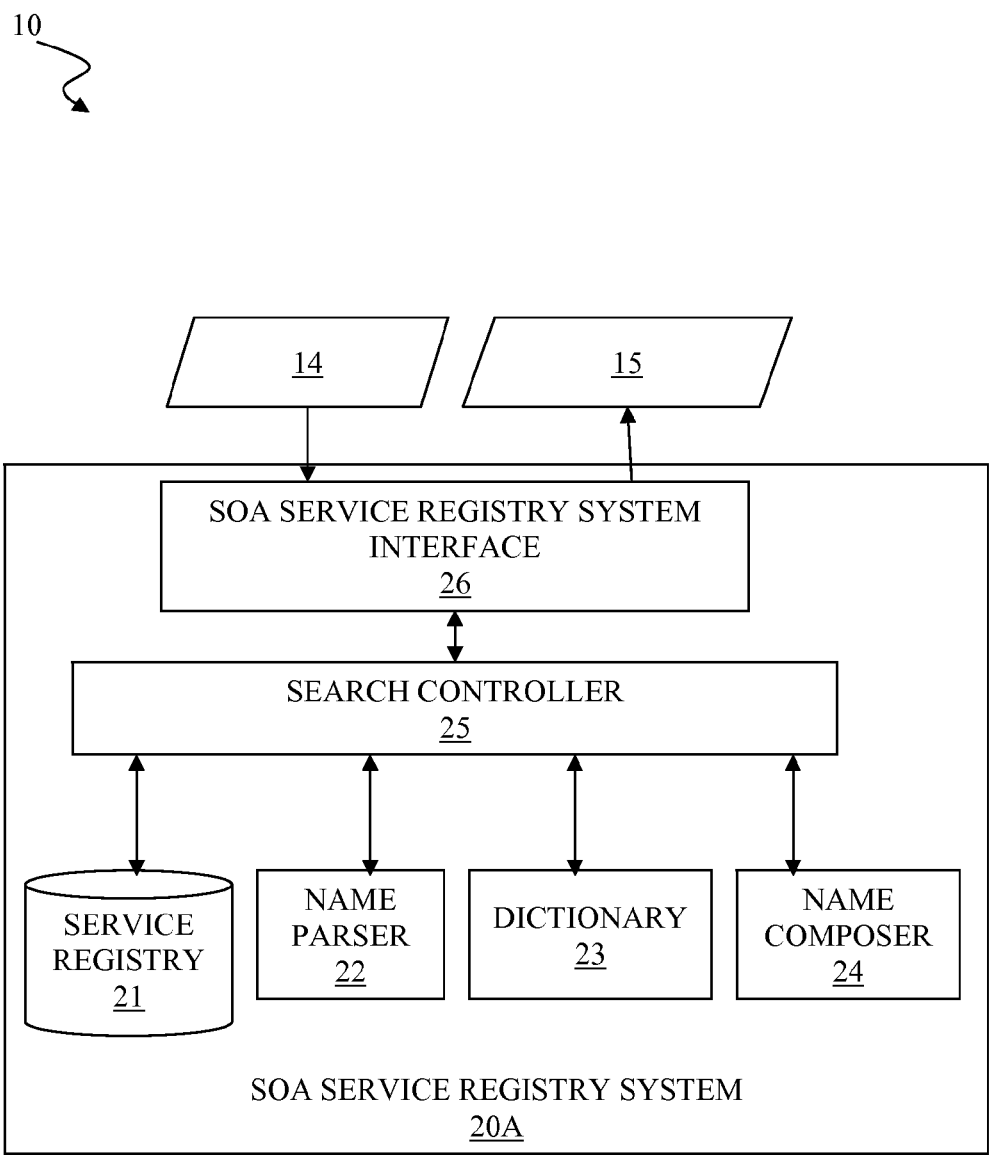
FIGS. 2A, 2B and 2C illustrate embodiments of the service oriented architecture (SOA) registry system of FIG. 1.

FIG. 2A illustrates a first embodiment of the service oriented architecture (SOA) registry system 20A of FIG. 1, supra.

The first SOA service registry system 20A comprises a service registry 21, a name parser 22, a dictionary 23, a name composer 24, a search controller 25, and a SOA service registry system interface 26. The first SOA service registry system 20A embodies the most generic configuration of a SOA registry system that provides advanced search capability, wherein a service name can be matched to identical and/or similar service name that had been provided by a user. In conventional SOA registry systems, search capability is limited and a service name identifying a service description needs to be identical to a service name given by a user to find a match.

The service registry 21 receives the service name 14 from the search controller 25 and returns the service description 15 to the search controller 25 if the service description 15 matching the service name 14 exists in the service registry 21. The service registry 21 also receives candidate service names generated by the name composer 24 from the search controller 25 and returns service descriptions found as matching the candidate service names existing in the service registry 21. The service registry 21 stores said at least one service description utilized in the SOA business application 17 of FIG. 1, supra, which is searchable by a respective service name. The service registry 21 utilizes the service name 14 as a key to search the service registry entries for the service description 15 associated with the service name 14. The service registry 21 may be implemented by used of a conventional SOA service registry system, enabling the advanced search functionality described in this specification for such conventional SOA service registry system.

The name parser 22 receives the service name 14 from the search controller 25. The name parser 22 generates a component word list from the service name 14, which comprises at least one word constitutes the service name 14. Each word is distinguished according to a shortest meaningful word listed in conventional dictionaries. For example, when the service name is "globalWeatherService", the name parser 22 generates the component word list {global, weather, service}, as shown in FIG. 4, infra. The name parser 22 returns the component word list to the search controller 25.

The dictionary 23 receives the component word list from the search controller 25. The dictionary 23 generates a respective synonym list for each word in the component word list generated by the name parser 22. The dictionary 23 returns the synonym list for each component word to the search controller 25.

The name composer 24 receives all synonym lists from the search controller 25. The name composer 24 generates a candidate service name list from the received synonym lists generated by the dictionary 23 such that the candidate service name list comprises at least one candidate service name that is not identical to the service name 14 but has a meaning similar to the service name 14.

The search controller 25 coordinates interactions among the service registry 21, the name parser 22, the dictionary 23, and the name composer 24 in performing advanced search with the service name 14 in the first SOA service registry system 20A. The search controller 25 provides a respective internal interface for the service registry 21, the name parser 22, the dictionary 23, and the name composer 24 in employing each component of the first SOA service registry system 20A. Since components of the first SOA service registry system 20A are loosely coupled by use of the search controller 25, the first SOA service registry system 20A may employ any implementation of the components if such implementation has application programming interface (API) specified. Consequently, the search controller 25 modularizes components of the first SOA service registry system 20A. Each component may be independently modified wherein the search controller 25 provides proper interface and coordination according to the modified component. See descriptions of FIG. 3, infra, for detailed operations of the search controller 25.

The SOA service registry system interface 26 is an external communication channel for the first SOA service registry system 20A through which the first SOA service registry system 20A communicates with the user of the IDE in FIG. 1 supra or other program components utilized in the SOA business application in FIG. 1 supra. Examples of the SOA service registry system interface 26 may be, inter alia, a combination of an input prompt for the service name 14 and an output display of the service description 15, an application programming interfaces (APIs) for other program components, etc.

Figure 2B:
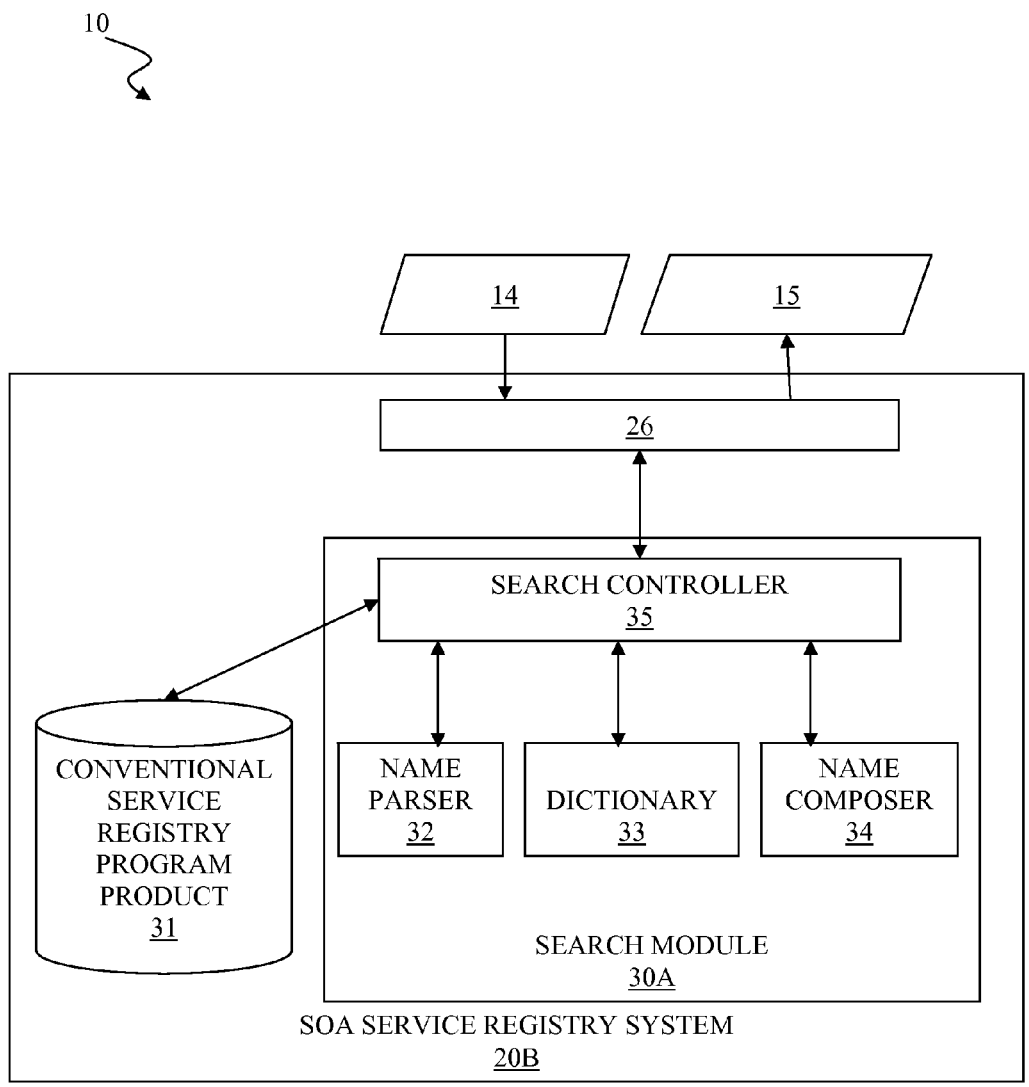

FIG. 2B illustrates a second embodiment of the service oriented architecture (SOA) registry system 20 of FIG. 1, supra.

The second SOA service registry system 20B comprises a search module 30A, a conventional service registry program product 31, and a SOA service registry system interface 26.

The second SOA service registry system 20B embodies a configuration improving search capability of the conventional service registry program product 31, wherein the service name 14 can be matched to service names with similar meanings even if there is no exact match for the service name 14 within the conventional service registry program product 31.

The search module 30A comprises a name parser 32, a dictionary 33, a name composer 34, and a search controller 35. See descriptions of FIG. 2A supra for details of the name parser 32, the dictionary 33, and the name composer 34.

The search controller 35 coordinates internal and external interactions among the conventional service registry program product 31 and components of the search module 30A in performing advanced search with the service name 14 in the second SOA service registry system 20B. The search controller 35 provides a respective internal interface for the name parser 32, the dictionary 33, and the name composer 34 in employing each component of the second SOA service registry system 20B. The search controller 35 also provides a seamless interface with the conventional service registry program product 31 for all components of the search module 30A. See descriptions of FIG. 3, infra, for detailed operations of the search controller 35.

The conventional service registry program product 31 receives the service name 14 and/or the candidate service names from the search controller 35 and returns the service description 15 that found to be matching to the received service name(s) to the search controller 25 if the service description 15 exists among entries of the conventional service registry program product 31.

Figure 2C:
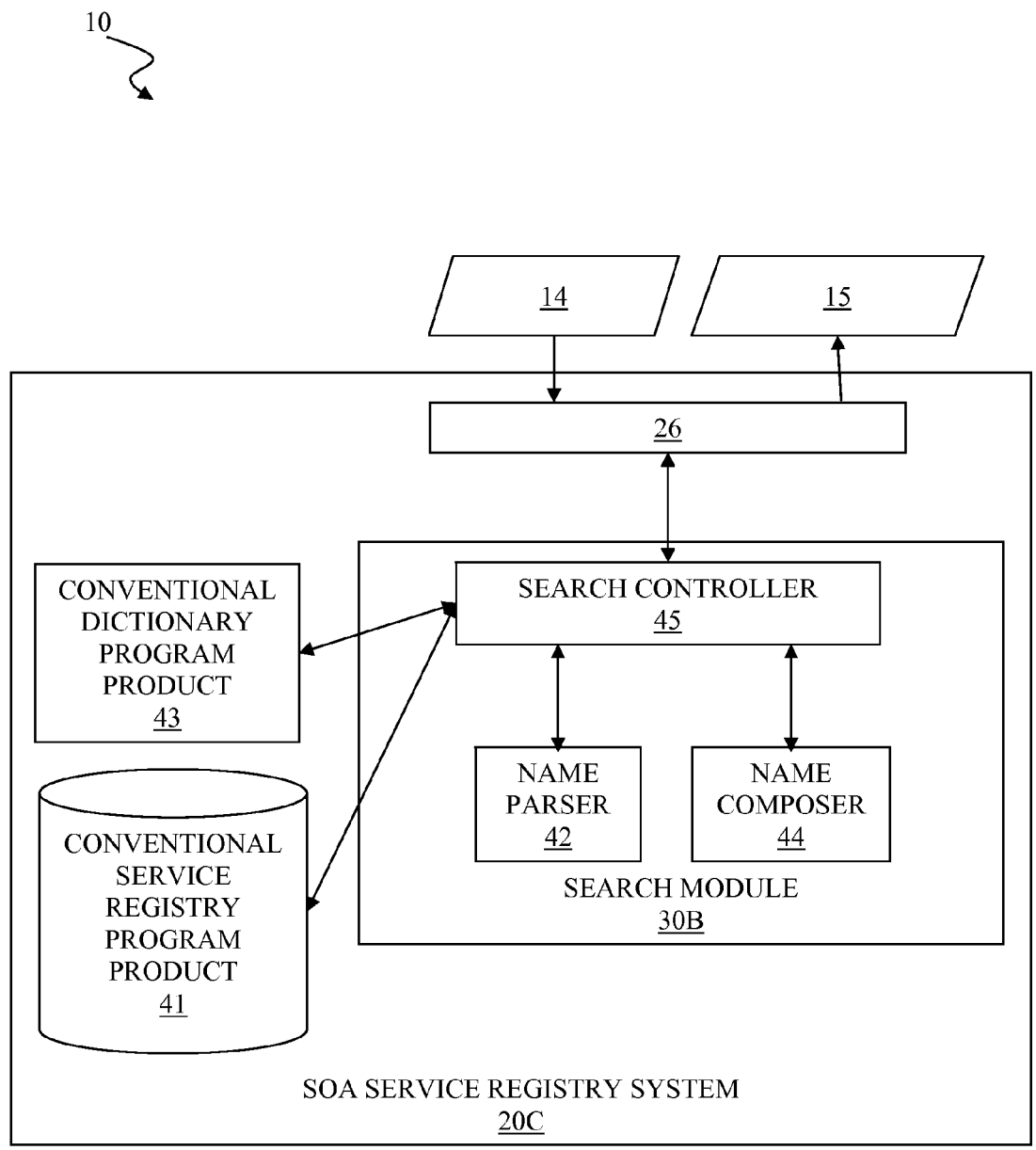

FIG. 2C illustrates a third embodiment of the service oriented architecture (SOA) registry system 20 of FIG. 1, supra.

The third SOA service registry system 20C comprises a search module 30B, a SOA service registry system interface 26, a conventional service registry program product 41, and a conventional dictionary program product 43. The third SOA service registry system 20C embodies a configuration improving search capability of the conventional service registry program product 41, wherein the service name 14 can be matched to candidate service names with similar meanings even if there is no exact match for the service name 14 within the conventional service registry program product 41, by use of the conventional dictionary program product 43 in generating the candidate service names.

The search module 30B comprises a name parser 42, a name composer 44, and a search controller 45. See descriptions of FIG. 2A supra for details of the name parser 42 and the name composer 44.

The search controller 45 coordinates internal and external interactions among the search module 30B, the conventional service registry program product 41, and the conventional dictionary program product 43 in performing advanced search with the service name 14 in the third SOA service registry system 20C. The search controller 45 provides a respective internal interface for the name parser 52 and the name composer 54 within the search module 30B. The search controller 45 provides a respective external interface between the conventional service registry program product 41 and the search module 30B as well as between the conventional dictionary program product 43 and the search module 30B. See descriptions of FIG. 3, infra, for detailed operations of the search controller 35.

The conventional dictionary program product 43 is particularly useful when generic terms are employed in the service name 14 and the third SOA service registry system 20C is used to generate extensive candidate service names for advanced search functionality. See descriptions of FIG. 2B, supra, for details of the conventional service registry program product 41.

Figure 3:
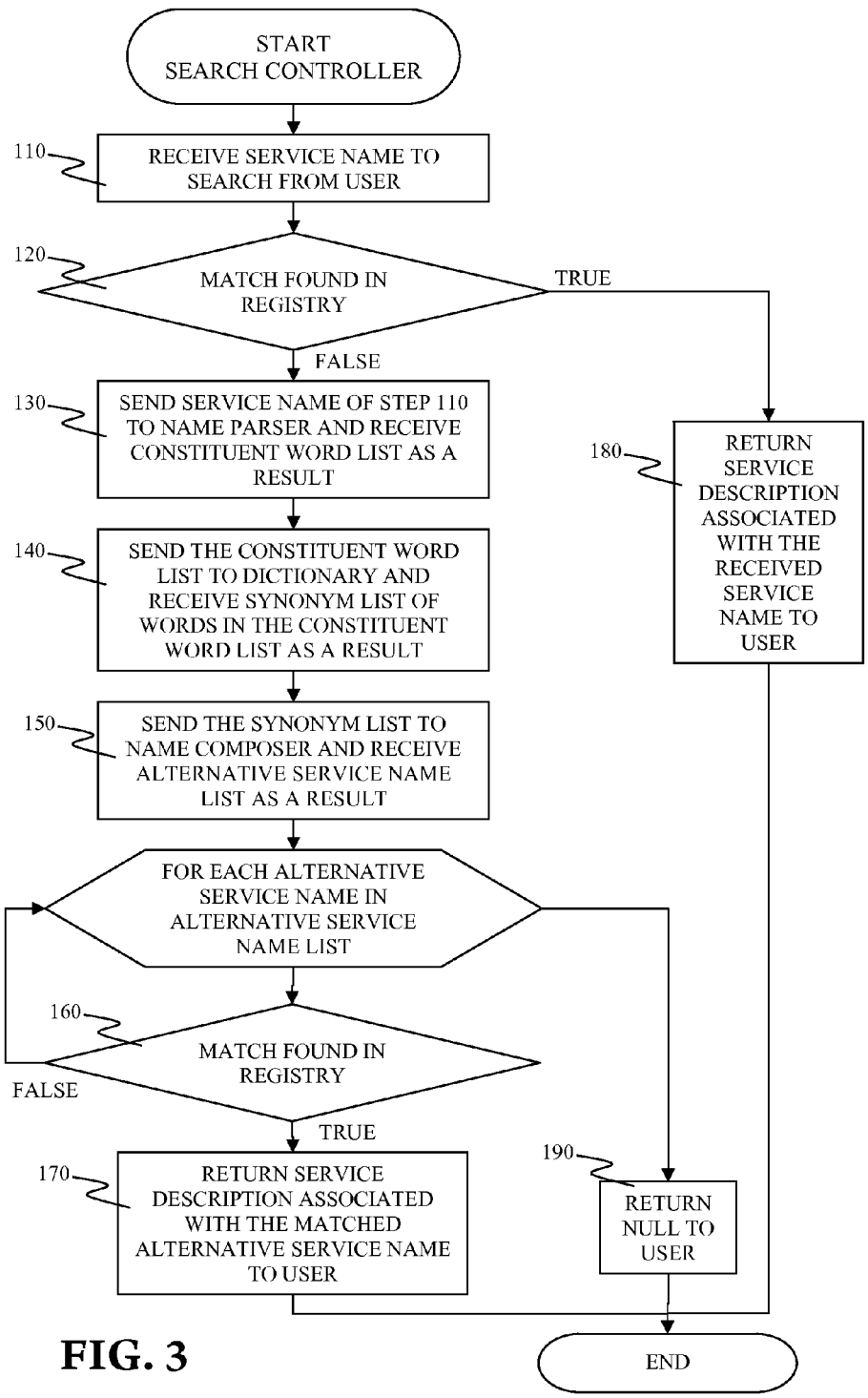
FIG. 3 is a flowchart depicting a method for searching a web service registry system in the integrated development environment (IDE) of FIG. 1, as performed by the search controller, in accordance with the embodiments of the present invention.

FIG. 3 is a flowchart depicting a method for searching a web service registry system in the integrated development environment (IDE) of FIG. 1, supra, as performed by the search controller, in accordance with the embodiments of the present invention.

In step 110, the search controller receives a service name from a user through the user interface. In the following steps 120 to 170, the search controller looks for a service description comprising a service name value that matches the received service name. In this specification, the service description stored in the registry has zero or more data field other than a service name field. Also in this specification, wherein a value of a service name field within a service description is identical to a first service name, the service description is referred to as being matched to the first service name. Then the search controller proceeds with step 120.

In step 120, the search controller searches the registry for the received service name and determines whether the service description that is matched to the received service name has been found in the registry. If the search controller determines that a matching service description of the received service name has been found in the registry, then the search controller proceeds with step 180. If the search controller determines that the matching service description of the received service name has not been found in the registry, then the search controller proceeds with step 130 to perform a series of searches based on the received service name.

In step 130, the search controller sends the service name received in step 110 to the name parser and receives a constituent word list comprising at least one constituent word of the received service name as parsed by the name parser as a result. See U.S. patent applications listed in the CROSS-REFERENCE TO RELATED APPLICATIONS section, supra, for detailed operations of the name parser. Then the search controller proceeds with step 140.

In step 140, the search controller sends the constituent word list received in step 130 to the dictionary and receives at least one synonym list for each constituent word in the constituent word list as generated by the dictionary as a result. See U.S. patent applications listed in the CROSS-REFERENCE TO RELATED APPLICATIONS section, supra, for detailed operations of the dictionary. Then the search controller proceeds with step 150.

In step 150, the search controller sends said at least one synonym list received in step 140 to the name composer and receives an alternative service name list comprising at least one alternative service name as a result. See U.S. patent applications listed in the CROSS-REFERENCE TO RELATED APPLICATIONS section, supra, for detailed operations of the name composer.

For each alternative service name in the alternative service name list received in step 150 supra, the search controller performs steps 160 and 170. Said each alternative service name is semantically similar to the received service name. The search controller selects a first alternative service name as a current alternative service name and proceeds with step 160.

In step 160, the search controller searches the registry for the current alternative service name and determines whether a service description matching the current alternative service name has been found in the registry. If the search controller determines that the service description matching the current alternative service name has been found in the registry, the search controller proceeds with step 170. If the search controller determines that the service description matching the current alternative service name has not been found in the registry, the search controller repeats step 160 with a next alternative service name from the alternative service name list. If no service description matching any alternative service name has been found upon performing step 160 for all alternative service names in the alternative service name list, the search controller proceeds with step 190.

In step 170, because the service description matching the current alternative service name has been found in the registry, the search controller returns the found service description to user. The search controller subsequently terminates processing the search request for the service name received in step 110.

In step 180, because the service description matching the service name received in step 110 has been found in the registry without the advanced search, the search controller returns the service description matching the received service name to user. Then the search controller terminates processing the search request for the service name received in step 110.

In step 190, because there is no service description in the registry that matches any alternative service name in the alternative service name list generated by the name composer, the search controller returns null to user. Then the search controller terminates processing the search request for the service name received in step 110.

FIG. 4 is an example listing of a service oriented architecture (SOA) service description written in the Web Services Description Language (WSDL), in accordance with the embodiments of the present invention.

In lines L101 through L105, various namespaces are declared. In lines L106 through L125, various data types are declared. In lines L126 through L131, message types are declared, which consist of an input message type and an output message type. In lines 132 through L137, various operations included in the web service are declared.

Figure 5:
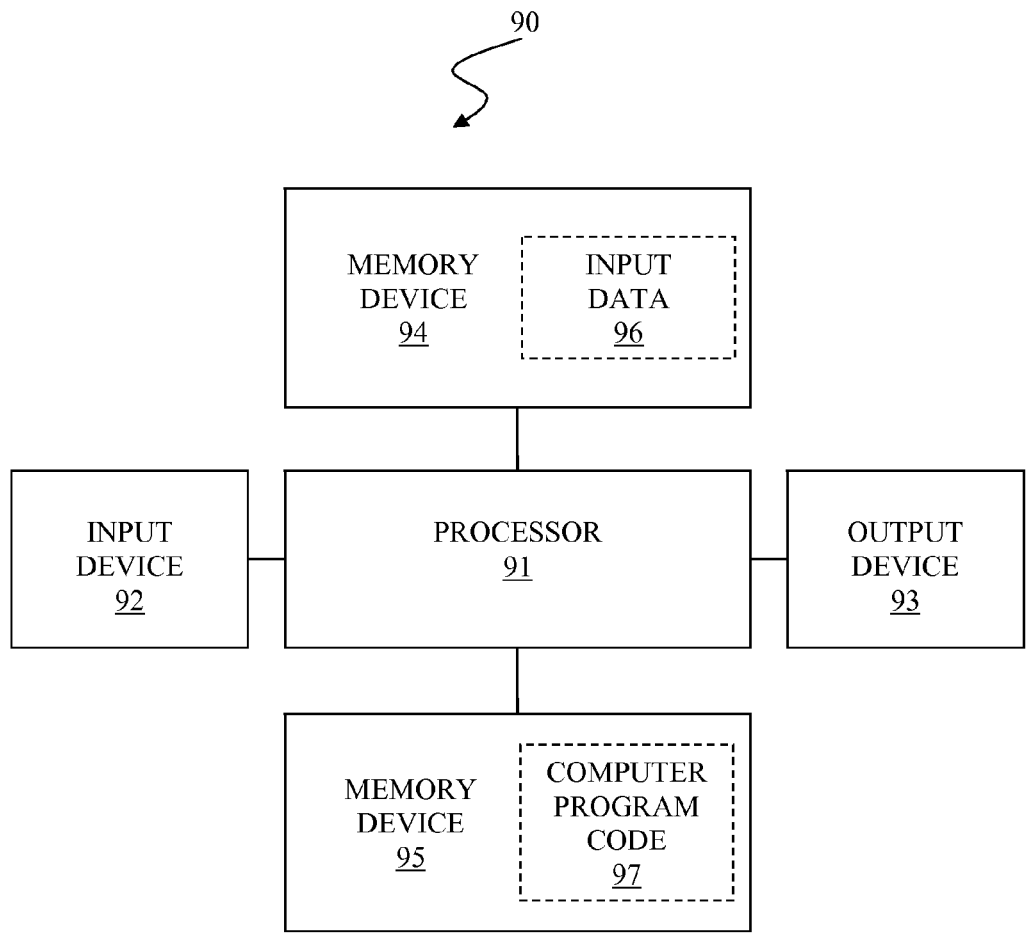
FIG. 5 illustrates a computer system used for searching a web service registry system in an integrated development environment (IDE), in accordance with the embodiments of the present invention.

FIG. 5 illustrates a computer system 90 used for searching a web service registry system in an integrated development environment (IDE), in accordance with the embodiments of the present invention.

The computer system 90 comprises a processor 91, an input device 92 coupled to the processor 91, an output device 93 coupled to the processor 91, and memory devices 94 and 95 each coupled to the processor 91. In this specification, the computer system 90 represents any type of programmable data processing apparatus.

The input device 92 is utilized to receive input data 96 into the computer system 90. The input device 92 may be, inter alia, a keyboard, a mouse, a keypad, a touch screen, a scanner, a voice recognition device, a sensor, a network interface card (NIC), a Voice/video over Internet Protocol (VOIP) adapter, a wireless adapter, a telephone adapter, a dedicated circuit adapter, etc. The output device 93 is utilized to communicate results generated by the computer program code 97 to a user of the computer system 90. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc.

Any of the components of the present invention can be deployed, managed, serviced, etc. by a service provider that offers to deploy or integrate computing infrastructure with respect to a process for performing a series of searches of the web service registry system of the present invention. Thus, the present invention discloses a process for supporting computer infrastructure, comprising integrating, hosting, maintaining and deploying computer-readable code into a computing system (e.g., computing system 90), wherein the code in combination with the computing system is capable of performing a method for searching the web service registry system.

In another embodiment, the invention provides a business method that performs the process steps of the invention on a subscription, advertising and/or fee basis. That is, a service provider, such as a Solution Integrator, can offer to create, maintain, support, etc., a process for searching the web service registry system of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. In this specification, the term "memory device" 94, 95 represent a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code 97 for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer program code 97 may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. The term "computer program instructions" is interchangeable with the term "computer program code" 97 in this specification. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for searching a web service registry system by use of a search controller, said method comprising:

the search controller receiving, via a processor of a computer system, a service name from a user of the web service registry system through a web service registry system interface through which the web service registry system communicates with components external to the web service registry system, wherein the web service registry system comprises a search module, the web service registry system interface, and a service registry program product external to the search module, wherein the search module comprises the search controller, a name parser, a dictionary, and a name composer, wherein the search controller is configured to communicate with the service registry program product, the name parser, the dictionary, and the name composer via a first internal interface, a second internal interface, a third internal interface, and a fourth internal interface, respectively, and wherein the service registry program product comprises at least one service description searchable by a respectively associated service name;

said processor performing a first search of the service registry program product with the received service name and subsequently determining that the received service name does not have a service description associated with the received service name in the service registry program product;

said processor coordinating a second search of the service registry program product with a candidate service name by use of the search module, wherein the candidate service name is semantically and syntactically interchangeable with the received service name such that the candidate service name identifies the service description associated with the received service name within the service registry program product; and said processor discovering that the service description is associated with the candidate service name within the service registry program product and subsequently returning the discovered service description to the user of the web service registry system, said coordinating comprising:

sending the received service name to the name parser via the second internal interface and subsequently receiving a component word list from the name parser via the second internal interface, wherein the component word list comprises all words constituting the received service name;

sending the component word list to the dictionary via the third internal interface and subsequently receiving a respective synonym list for each word in the component word list from the dictionary via the third internal interface, wherein the respective synonym list comprises at least one synonym of said each word in the component word list;

sending the respective synonym list to the name composer via the fourth internal interface and subsequently receiving the candidate service name from the name composer via the fourth internal interface; and sending a second search request for the service description associated with the candidate service name to the service registry program product via the first internal interface and subsequently receiving the service description in response to the second search request via the first internal interface.

2. The method of claim 1, said performing the first search comprising:

sending a first search request for the service description associated with the received service name to the service registry program product; and receiving a null from the service registry program product in response to the first search request, wherein the service registry program product returns the null upon failing to find the service description associated with the received service name.

3. The method of claim 1, wherein the received service description is employed in the SOA business application that provides a service described in the received service description.

4. The method of claim 1, wherein the service description comprises elements selected from the group consisting of development time information, a communication protocol, a message format, runtime information, and combinations thereof, wherein the development time information is selected from the group consisting of a first set of operations exposed by the service name and a second set of operations exposed by the candidate service name, wherein the communication protocol is selected from the group consisting of the Hypertext Transfer Protocol (HTTP), the Internet Inter-Orb Protocol (HOP), the Java Remote Method Protocol (JRMP), and the Java Message Service (JMS) protocol, wherein the message format comprises the Simple Object Access Protocol (SOAP), wherein the runtime information is selected from the group consisting of the Internet Protocol (IP) address, a port number for the service description, and combinations thereof, and wherein the service description is represented in the Web Service Description Language (WSDL) format.

5. A computer program product comprising:

a computer readable hardware storage device having a computer readable program code embodied therein, said computer readable program code containing instructions that, upon being executed by a processor of a computer system, perform a method of searching a web service registry system by use of a search controller, said method comprising:

the search controller receiving, via the processor, a service name from a user of the web service registry system through a web service registry system interface through which the web service registry system communicates with components external to the web service registry system, wherein the web service registry system comprises a search module, the web service registry system interface, and a service registry program product external to the search module, wherein the search module comprises the search controller, a name parser, a dictionary, and a name composer, wherein the search controller is configured to communicate with the service registry program product, the name parser, the dictionary, and the name composer via a first internal interface, a second internal interface, a third internal interface, and a fourth internal interface, respectively, and wherein the service registry program product comprises at least one service description searchable by a respectively associated service name;

said processor performing a first search of the service registry program product with the received service name and subsequently determining that the received service name does not have a service description associated with the received service name in the service registry program product;

said processor coordinating a second search of the service registry program product with a candidate service name by use of the search module, wherein the candidate service name is semantically and syntactically interchangeable with the received service name such that the candidate service name identifies the service description associated with the received service name within the service registry program product; and said processor discovering that the service description is associated with the candidate service name within the service registry program product and subsequently returning the discovered service description to the user of the web service registry system, said coordinating comprising:

sending the received service name to the name parser via the second internal interface and subsequently receiving a component word list from the name parser via the second internal interface, wherein the component word list comprises all words constituting the received service name;

sending the component word list to the dictionary via the third internal interface and subsequently receiving a respective synonym list for each word in the component word list from the dictionary via the third internal interface, wherein the respective synonym list comprises at least one synonym of said each word in the component word list;

sending the respective synonym list to the name composer via the fourth internal interface and subsequently receiving the candidate service name from the name composer via the fourth internal interface; and sending a second search request for the service description associated with the candidate service name to the service registry program product via the first internal interface and subsequently receiving the service description in response to the second search request via the first internal interface.

6. The computer program product of claim 5, said performing the first search comprising:

sending a first search request for the service description associated with the received service name to the service registry program product; and receiving a null from the service registry program product in response to the first search request, wherein the service registry program product returns the null upon failing to find the service description associated with the received service name.

7. The computer program product of claim 5, wherein the received service description is employed in the SOA business application that provides a service described in the received service description.

8. The computer program product of claim 5, wherein the service description comprises elements selected from the group consisting of development time information, a communication protocol, a message format, runtime information, and combinations thereof, wherein the development time information is selected from the group consisting of a first set of operations exposed by the service name and a second set of operations exposed by the candidate service name, wherein the communication protocol is selected from the group consisting of the Hypertext Transfer Protocol (HTTP), the Internet Inter-Orb Protocol (HOP), the Java Remote Method Protocol (JRMP), and the Java Message Service (JMS) protocol, wherein the message format comprises the Simple Object Access Protocol (SOAP), wherein the runtime information is selected from the group consisting of the Internet Protocol (IP) address, a port number for the service description, and combinations thereof, and wherein the service description is represented in the Web Service Description Language (WSDL) format.

9. A computer system comprising a processor and a computer readable memory unit coupled to the processor, said computer readable memory unit containing instructions that when executed by the processor implement a method for searching a web service registry system by use of a search controller, said method comprising:

the search controller receiving, via the processor, a service name from a user of the web service registry system through a web service registry system interface through which the web service registry system communicates with components external to the web service registry system, wherein the web service registry system comprises a search module, the web service registry system interface, and a service registry program product external to the search module, wherein the search module comprises the search controller, a name parser, a dictionary, and a name composer, wherein the search controller is configured to communicate with the service registry program product, the name parser, the dictionary, and the name composer via a first internal interface, a second internal interface, a third internal interface, and a fourth internal interface, respectively, and wherein the service registry program product comprises at least one service description searchable by a respectively associated service name;

said processor performing a first search of the service registry program product with the received service name and subsequently determining that the received service name does not have a service description associated with the received service name in the service registry program product;

said processor coordinating a second search of the service registry program product with a candidate service name by use of the search module, wherein the candidate service name is semantically and syntactically interchangeable with the received service name such that the candidate service name identifies the service description associated with the received service name within the service registry program product; and said processor discovering that the service description is associated with the candidate service name within the service registry program product and subsequently returning the discovered service description to the user of the web service registry system, said coordinating comprising:

sending the received service name to the name parser via the second internal interface and subsequently receiving a component word list from the name parser via the second internal interface, wherein the component word list comprises all words constituting the received service name;

sending the component word list to the dictionary via the third internal interface and subsequently receiving a respective synonym list for each word in the component word list from the dictionary via the third internal interface, wherein the respective synonym list comprises at least one synonym of said each word in the component word list;

sending the respective synonym list to the name composer via the fourth internal interface and subsequently receiving the candidate service name from the name composer via the fourth internal interface; and sending a second search request for the service description associated with the candidate service name to the service registry program product via the first internal interface and subsequently receiving the service description in response to the second search request via the first internal interface.

10. The computer system of claim 9, said performing the first search comprising:

sending a first search request for the service description associated with the received service name to the service registry program product; and receiving a null from the service registry program product in response to the first search request, wherein the service registry program product returns the null upon failing to find the service description associated with the received service name.

11. The computer system of claim 9, wherein the received service description is employed in the SOA business application that provides a service described in the received service description.

12. The computer system of claim 9, wherein the service description comprises elements selected from the group consisting of development time information, a communication protocol, a message format, runtime information, and combinations thereof, wherein the development time information is selected from the group consisting of a first set of operations exposed by the service name and a second set of operations exposed by the candidate service name, wherein the communication protocol is selected from the group consisting of the Hypertext Transfer Protocol (HTTP), the Internet Inter-Orb Protocol (HOP), the Java Remote Method Protocol (JRMP), and the Java Message Service (JMS) protocol, wherein the message format comprises the Simple Object Access Protocol (SOAP), wherein the runtime information is selected from the group consisting of the Internet Protocol (IP) address, a port number for the service description, and combinations thereof, and wherein the service description is represented in the Web Service Description Language (WSDL) format.

13. A process for supporting computer infrastructure, said process comprising storing computer-readable code in a computer system through use of a processor of the computer system, wherein the code is executed by the processor to perform a method for searching a web service registry system by use of a search controller, said method comprising:

the search controller receiving, via a processor of the computer system, a service name from a user of the web service registry system through a web service registry system interface through which the web service registry system communicates with components external to the web service registry system, wherein the web service registry system comprises a search module, the web service registry system interface, and a service registry program product external to the search module, wherein the search module comprises the search controller, a name parser, a dictionary, and a name composer, wherein the search controller is configured to communicate with the service registry program product, the name parser, the dictionary, and the name composer via a first internal interface, a second internal interface, a third internal interface, and a fourth internal interface, respectively, and wherein the service registry program product comprises at least one service description searchable by a respectively associated service name;

said processor performing a first search of the service registry program product with the received service name and subsequently determining that the received service name does not have a service description associated with the received service name in the service registry program product;

said processor coordinating a second search of the service registry program product with a candidate service name by use of the search module, wherein the candidate service name is semantically and syntactically interchangeable with the received service name such that the candidate service name identifies the service description associated with the received service name within the service registry program product; and said processor discovering that the service description is associated with the candidate service name within the service registry program product and subsequently returning the discovered service description to the user of the web service registry system, said coordinating comprising:

sending the received service name to the name parser via the second internal interface and subsequently receiving a component word list from the name parser via the second internal interface, wherein the component word list comprises all words constituting the received service name;

sending the component word list to the dictionary via the third internal interface and subsequently receiving a respective synonym list for each word in the component word list from the dictionary via the third internal interface, wherein the respective synonym list comprises at least one synonym of said each word in the component word list;

sending the respective synonym list to the name composer via the fourth internal interface and subsequently receiving the candidate service name from the name composer via the fourth internal interface; and sending a second search request for the service description associated with the candidate service name to the service registry program product via the first internal interface and subsequently receiving the service description in response to the second search request via the first internal interface.

14. The process of claim 13, said performing the first search comprising:

sending a first search request for the service description associated with the received service name to the service registry program product; and receiving a null from the service registry program product in response to the first search request, wherein the service registry program product returns the null upon failing to find the service description associated with the received service name.

15. The process of claim 13, wherein the received service description is employed in the SOA business application that provides a service described in the received service description.

16. The process of claim 13, wherein the service description comprises elements selected from the group consisting of development time information, a communication protocol, a message format, runtime information, and combinations thereof, wherein the development time information is selected from the group consisting of a first set of operations exposed by the service name and a second set of operations exposed by the candidate service name, wherein the communication protocol is selected from the group consisting of the Hypertext Transfer Protocol (HTTP), the Internet Inter-Orb Protocol (HOP), the Java Remote Method Protocol (JRMP), and the Java Message Service (JMS) protocol, wherein the message format comprises the Simple Object Access Protocol (SOAP), wherein the runtime information is selected from the group consisting of the Internet Protocol (IP) address, a port number for the service description, and combinations thereof, and wherein the service description is represented in the Web Service Description Language (WSDL) format.

* * * * *